(12) United States Patent
Kurian et al.

(10) Patent No.: US 11,765,698 B2
(45) Date of Patent: Sep. 19, 2023

(54) CONCURRENT MULTI-BAND OPERATION OF A PEER-TO-PEER LINK

(71) Applicant: Apple Inc., Cupertino, CA (US)

(72) Inventors: Lawrie Kurian, San Jose, CA (US); Tashbeeb Haque, San Francisco, CA (US); Anand Rajagopalan, Saratoga, CA (US); Santosh Lnu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 17/460,884

(22) Filed: Aug. 30, 2021

(65) Prior Publication Data

US 2022/0110102 A1 Apr. 7, 2022

Related U.S. Application Data

(60) Provisional application No. 63/087,377, filed on Oct. 5, 2020.

(51) Int. Cl.
*H04W 4/00* (2018.01)
*H04W 72/044* (2023.01)
*H04W 48/16* (2009.01)
*H04W 84/18* (2009.01)

(52) U.S. Cl.
CPC ......... *H04W 72/044* (2013.01); *H04W 48/16* (2013.01); *H04W 84/18* (2013.01)

(58) Field of Classification Search
CPC ............... H04W 72/044; H04W 72/04; H04W 72/0453; H04W 72/0446; H04W 48/16; H04W 88/02; H04W 88/06; H04W 88/08; H04W 24/00; H04W 76/02; H04W 16/10; H04W 16/14; H04W 84/18; H04W 28/16; H04L 5/0007; H04B 1/005; H04B 1/006
USPC ............ 370/330; 455/450, 41.1, 41.2, 550.1, 455/552.1, 553.1, 562.1
See application file for complete search history.

(56) References Cited

U.S. PATENT DOCUMENTS

| | | | |
|---|---|---|---|
| 10,051,676 B2 | 8/2018 | Qi et al. | |
| 2014/0112242 A1 | 4/2014 | Vilmur et al. | |
| 2016/0192282 A1 | 6/2016 | Elhaddad et al. | |
| 2019/0124660 A1* | 4/2019 | Huang | H04W 76/14 |
| 2019/0166636 A1* | 5/2019 | Sahu | H04W 88/10 |
| 2020/0120458 A1* | 4/2020 | Aldana | H04W 72/51 |

* cited by examiner

*Primary Examiner* — Temica M Beamer
(74) *Attorney, Agent, or Firm* — Kowert, Hood, Munyon, Rankin & Goetzel, P.C.

(57) ABSTRACT

An electronic device that communicates with a second electronic device is described. During operation, an electronic device communicates first messages with the second electronic device in time slots corresponding to first channels in a first band of frequencies using a peer-to-peer communication protocol (such as neighbor awareness networking or NaN), where, in a given time slot, a given first channel in the first band of frequencies is used in the communication of the first messages. Moreover, the electronic device communicates second messages with the second electronic device in the time slots corresponding to second channels in a second band of frequencies using the peer-to-peer communication protocol, where, in the given time slot, a given second channel in the second band of frequencies is used in the communication of the second messages. Note that the communicating of the first messages and the second messages may at least partially overlap in time.

20 Claims, 11 Drawing Sheets

CONCURRENT MULTI-BAND OPERATION OF A PEER-TO-PEER LINK

CROSS-REFERENCE TO RELATED APPLICATION

This application claims the benefit of U.S. Provisional Application No. 63/087,377, entitled "Concurrent Multi-Band Operation of a Peer-to-Peer Link," by Lawrie Kurian, et al., filed Oct. 5, 2020, the contents of which are hereby incorporated by reference.

FIELD

The described embodiments relate, generally, to wireless communications among electronic devices, including techniques for concurrent operation of a peer-to-peer link in multiple bands of frequencies.

BACKGROUND

Many electronic devices communicate messages (such as packets or frames) with each other using channels during time slots in accordance with a peer-to-peer communication protocol, such as a neighbor awareness protocol or neighbor awareness networking or NaN (from the Wi-Fi Alliance, of Austin, Tex.). In NaN, two or more electronic devices may implement an independent basic service set (IBSS) or an ad-hoc network. NaN offers the advantage of not having to pass the communication through a router or an access point.

However, the communication performance using NAN may be adversely impacted by during infra-structure communication with an access point by one of the peers using a communication protocol that is compatible with an Institute of Electrical and Electronics Engineers (IEEE) 802.11 standard (which is sometimes referred to as Wi-Fi). For example, because of coexisting NaN and infra-structure (Wi-Fi) communication, the latency of NAN traffic for real-time applications or services (such as an audio and/or a video application) may be increased. Moreover, a given electronic device may need to periodically perform a wireless scan, which may involve pausing NaN traffic during a time slot, so that the given electronic device can use a channel to perform the scan. Furthermore, the given electronic device may have to pause NaN traffic when its peer (a second electronic device) is associating with an access point or roaming from one access point to another access point.

SUMMARY

An electronic device that communicates with a second electronic device is described. This electronic device includes: an antenna node that can communicatively couple to an antenna; and an interface circuit that communicates with the second electronic device. During operation, the interface circuit communicates first messages with the second electronic device in time slots corresponding to first channels in a first band of frequencies using a peer-to-peer communication protocol, where, in a given time slot, a given first channel in the first band of frequencies is used in the communication of the first messages. Then, the interface circuit communicates second messages with the second electronic device in the time slots corresponding to second channels in a second band of frequencies using the peer-to-peer communication protocol, where, in the given time slot, a given second channel in the second band of frequencies is used in the communication of the second messages. Note that the second channels are different from the first channels.

Moreover, the peer-to-peer communication protocol may be compatible with an IEEE 802.11 communication protocol.

Furthermore, the peer-to-peer communication protocol may include a NaN protocol.

Additionally, the first band of frequencies may include a 2.4 GHz band of frequencies and the second band of frequencies may include: a 5 GHz band of frequencies or a 6 GHz band of frequencies.

In some embodiments, the communicating of the first messages and the communicating of the second messages may be based at least in part on a schedule that includes a first map indicating the time slots corresponding to the first channels, and a second map indicating the time slots corresponding to the second channels.

Note that the communicating of the first messages and the communicating of the second messages may at least partially overlap in time.

Moreover, for the given time slot, the given second channel in the second band of frequencies may be preferred for communication associated with an application having a latency requirement that satisfies a predefined value.

Furthermore, the interface circuit may communicate with an access point in second time slots corresponding to third channels in the second band of frequencies.

Additionally, the interface circuit may perform an off-channel activity in at least one of the time slots using at least some of the first channels, and/or at least some of the second channels. Note that the off-channel activity may use a different communication protocol than the peer-to-peer communication protocol.

In some embodiments, the interface circuit may perform a wireless scan in one of the first channels in a first time slot in the time slots and one of the second channels in a second time slot in the time slots, where the first time slot and the second time slot are sequential time slots. Note that the wireless scan may be compatible with an IEEE 802.11 communication protocol. Moreover, the interface circuit may provide, while the interface circuit performs the wireless scan, an update message addressed to the second electronic device with information specifying availability of the electronic device in the time slots and the first channels and the second channels.

Furthermore, the interface circuit may receive, while the interface circuit performs a wireless scan in alternating sequential time slots in the time slots and alternating channels in the first channels and the second channels, an update message associated with the second electronic device. This update message may include information specifying availability of the second electronic device in the time slots and the first channels and the second channels. Additionally, the interface circuit may selectively transmit additional messages addressed to the second electronic device in the time slots corresponding to the first channels or the second channels based at least in part on the update message.

In some embodiments, the interface circuit may perform association with an access point in the second channels in the time slots while communicating the first messages in the time slots in the first channels. Note that the association may be compatible with an IEEE 802.11 communication protocol. Moreover, after the association is complete, the interface circuit may: provide an update message addressed to the second electronic device that includes information specifying a subset of the time slots and a third channel used during communication with the access point; and resume the communicating of the second messages in a remainder of the time slots and the second channels using the peer-to-peer communication protocol.

Furthermore, the first messages and the second messages may include packets or frames.

Other embodiments provide the second electronic device that performs counterpart operations to at least some of the operations performed by the electronic device.

Other embodiments provide the access point that performs counterpart operations to at least some of the operations performed by the electronic device.

Other embodiments provide an integrated circuit (which is sometimes referred to as a 'communication circuit') for use with the electronic device, the second electronic device or the access point. The integrated circuit may perform at least some of the aforementioned operations.

Other embodiments provide a computer-readable storage medium for use with the electronic device, the second electronic device or the access point. When program instructions stored in the computer-readable storage medium are executed by the electronic device, the second electronic device or the access point, the program instructions may cause the electronic device, the second electronic device or the access point to perform at least some of the aforementioned operations of the electronic device, the second electronic device or the access point.

Other embodiments provide a method. The method includes at least some of the aforementioned operations performed by the electronic device, the second electronic device or the access point.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
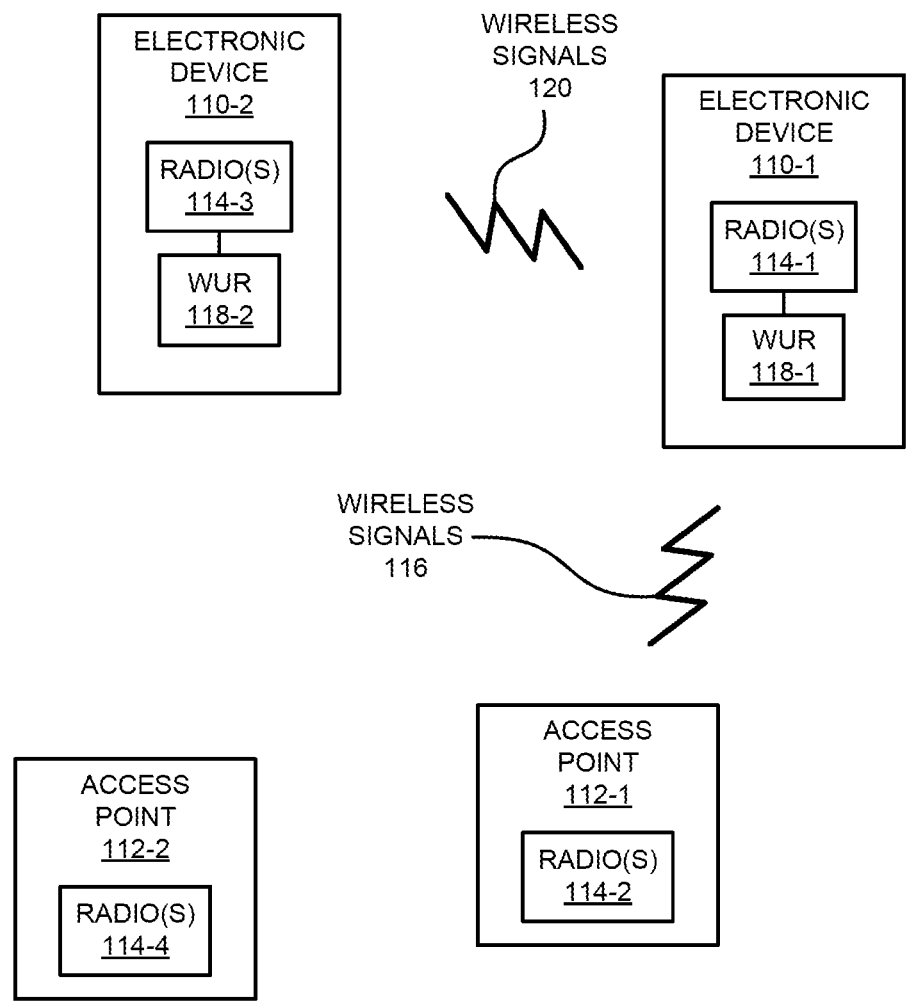
FIG. 1 illustrates an example network environment for communication between electronic devices according to some embodiments of the disclosure.

Some embodiments include an electronic device that communicates with a second electronic device. During operation, the electronic device may communicate first messages with the second electronic device in time slots corresponding to first channels in a first band of frequencies using a peer-to-peer communication protocol (such as NaN), where, in a given time slot, a given first channel in the first band of frequencies is used in the communication of the first messages. Moreover, the electronic device may communicate second messages with the second electronic device in the time slots corresponding to second channels in a second band of frequencies using the peer-to-peer communication protocol, where, in the given time slot, a given second channel in the second band of frequencies is used in the communication of the second messages. Note that the communicating of the first messages and the second messages may at least partially overlap in time.

By communicating using the first channels and the second channels, these communication techniques may improve communication performance when using the peer-to-peer communication protocol. Moreover, the communication techniques may facilitate coexisting use of the peer-to-peer communication protocol and infra-structure (Wi-Fi) communication. For example, the communication techniques may reduce the latency of NAN traffic for real-time applications or services (such as an audio and/or a video application). Moreover, the communication techniques may reduce or eliminate need to pause traffic associated with the peer-to-peer communication protocol, such as during periodic wireless scans, association with an access point or roaming from one access point to another access point. Consequently, the communication techniques may improve the user experience and customer satisfaction when using the electronic device, the second electronic device and/or the access point.

As noted previously, the communication techniques may be used during wireless communication between electronic devices in accordance with a peer-to-peer communication protocol, such as NaN or another peer-to-peer communication protocol. In the discussion that follows, NaN is used as an illustrative example. Moreover, the communication techniques may be used during wireless communication between electronic devices using another type of communication protocol, such as a communication protocol that is compatible with an IEEE 802.11 standard (which is sometimes referred to as Wi-Fi). However, the communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a wireless local area networks (WLAN), and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and one or more of access points 112 may communicate wirelessly in a WLAN using an IEEE 802.11 communication protocol. Thus, electronic devices 110 may be associated with or may have one or more connections with at least one of access points 112. For example, electronic devices 110 and access point 112-1 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that one or more of access points 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

Moreover, pairs of electronic devices 110, such as electronic device 110-1 and electronic device 110-2 (which are sometimes referred to as 'peers'), may communicate wirelessly using a peer-to-peer communication protocol, such as NaN. During NaN, the peers may synchronize their clocks. Once synchronized, the peers may communicate using a scheduled combination of temporal multiplexing and frequency multiplexing. Notably, a band of frequencies may be divided into channels, which are used during time slots. Moreover, each of electronic devices 110 may publish or advertise their NaN schedule, including the channels and time slots that they will use.

Figure 12:
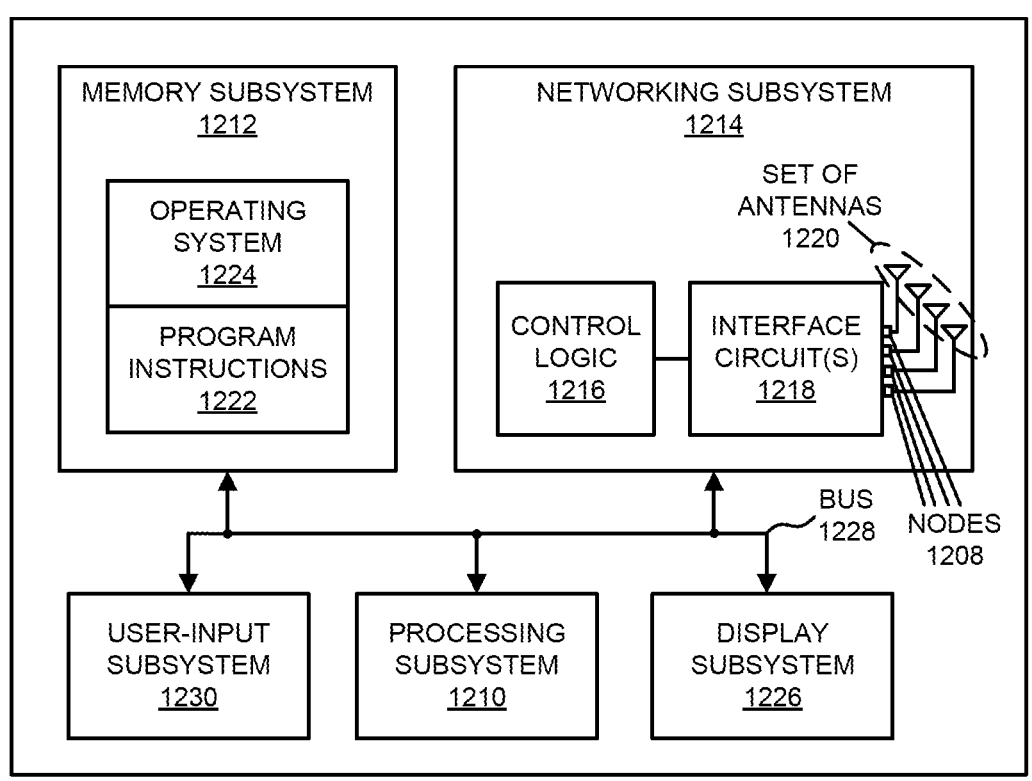
FIG. 12 illustrates an example of an electronic device, e.g., of FIG. 1, according to some embodiments of the disclosure.

As described further below with reference to FIG. 12, electronic devices 110 and access points 112 may include subsystems, such as a networking subsystem, a memory subsystem, and a processor subsystem. In addition, electronic devices 110 and access points 112 may include radios 114 in the networking subsystems. More generally, electronic devices 110 and access points 112 can include (or can be included within) any electronic devices with networking subsystems that enable one of electronic devices 110 or one of access points 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112-1, respectively. For example, as noted previously, electronic device 110-1 and access point 112-1 may exchange packets or frames using a Wi-Fi communication protocol in a WLAN. One or more radios 114-1 may receive wireless signals 116 that are transmitted by one or more radios 114-2 via one or more links between electronic device 110-1 and access point 112-1. Alternatively, the one or more radios 114-1 may transmit wireless signals 116 that are received by the one or more radios 114-2.

Moreover, wireless signals 120 (represented by a jagged line) are communicated by one or more radios 114-1 and 114-3 in electronic device 110-1 and electronic device 110-3, respectively. For example, as noted previously, electronic device 110-1 and electronic device 110-3 may exchange packets or frames using NaN. As illustrated further below with reference to FIGS. 2-10, one or more radios 114-1 may transmit wireless signals 120 that are received by one or more radios 114-3 via one or more links between electronic device 110-1 and electronic device 110-2. Alternatively, the one or more radios 114-3 may transmit wireless signals 120 that are received by the one or more radios 114-1.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from one or more of access points 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

As discussed previously, coexisting NaN and infra-structure (Wi-Fi) communication may degrade the communication performance of NaN between peers, such as electronic devices 110-1 and 110-2. For example, the coexisting communication may increase the latency of NAN traffic for real-time applications or services (such as an audio and/or a video application).

In order to address these challenges, as described below with reference to FIGS. 2-10, in some embodiments of the disclosed communication techniques electronic device 110-1 may communicate first messages with electronic device 110-2 in time slots and first channels in a first band of frequencies using a peer-to-peer communication protocol, where, in a given time slot, a given first channel in the first band of frequencies is used in the communication of the first messages. Then, electronic device 110-1 communicates second messages with electronic device 110-2 in the time slots and second channels in a second band of frequencies using the peer-to-peer communication protocol, where, in the given time slot, a given second channel in the second band of frequencies is used in the communication of the second messages. Note that the second channels are different from the first channels.

In some embodiments, the communicating of the first messages and the communicating of the second messages may be based at least in part on a schedule that includes a first map indicating the time slots and the first channels, and a second map indicating the time slots and the second channels. Note that the communicating of the first messages and the communicating of the second messages may at least partially overlap in time.

Moreover, electronic device 110-1 may perform an off-channel activity in at least one of the time slots using at least some of the first channels, and/or at least some of the second channels. Note that the off-channel activity may use a different communication protocol than the peer-to-peer communication protocol, such as Wi-Fi or a communication protocol that is compatible with an IEEE 802.11 standard. For example, electronic device 110-1 may: perform a wireless scan in one of the first channels in a first time slot in the time slots and one of the second channels in a second time slot in the time slots, where the first time slot and the second time slot are sequential time slots; provide an update message specifying availability of electronic device 110-1, receive an update message specifying availability of electronic device 110-2, transmit additional messages, and/or perform association with access points 112-1. Alternatively or additionally, electronic device 110-1 may communicate with access point 112-1 in second time slots and third channels in the second band of frequencies.

In summary, the communication techniques may improve communication performance during coexisting NaN and infra-structure (Wi-Fi) communication. For example, the communication techniques may be able to use all the available NaN time slots. Consequently, the communication techniques may reduce the latency of NAN traffic for real-time applications or services (such as an audio and/or a video application). Moreover, the communication techniques may reduce or eliminate need to pause traffic associated with the peer-to-peer communication protocol, such as during periodic wireless scans, association with an access point or roaming from one access point to another access point.

Note that the one or more access points 112 and one or more electronic devices (such as electronic devices 110-1 and/or 110-2) may be compatible with an IEEE 802.11 standard that includes trigger-based channel access (such as IEEE 802.11ax). However, the one or more access points 112 and the one or more electronic devices may also communicate with one or more legacy electronic devices that are not compatible with the IEEE 802.11 standard (i.e., that do not use multi-user trigger-based channel access). In some embodiments, the one or more access points 112 and the one or more electronic devices use multi-user transmission (such as OFDMA). For example, the one or more radios 114-2 may provide one or more trigger frames for the one or more electronic devices. Moreover, in response to receiving the one or more trigger frames, the one or more radios 114-1 may provide one or more group or block acknowledgments (BAs) to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and one of access points 112 includes: receiving wireless signals 116 or 120 encoding a packet or a frame; decoding/extracting the packet or frame from received wireless signals 116 or 120 to acquire the packet or frame; and processing the packet or frame to determine information contained in the packet or frame (such as data in the payload).

In general, the communication via NaN or in the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between one or more of electronic devices 110 and/or one or more of access points 112. Consequently, one of electronic devices 110 and/or one of access points 112 may perform operations in the communication techniques.

Figure 2:
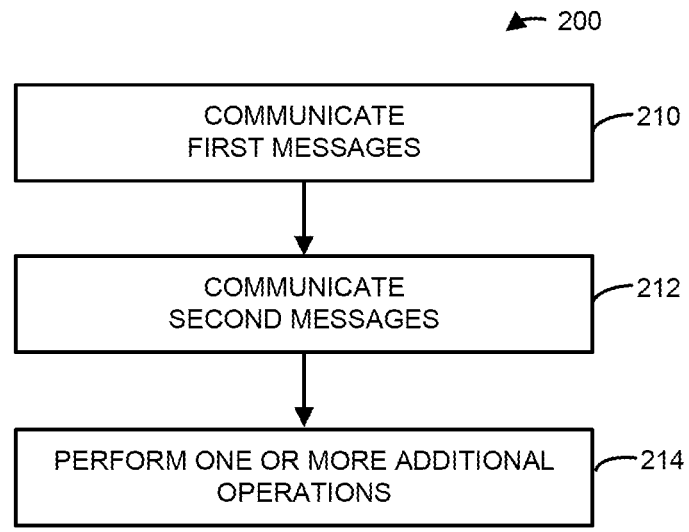
FIG. 2 illustrates an example method for communicating with a second electronic device according to some embodiments of the disclosure.

FIG. 2 presents a flow diagram illustrating an example method 200 for communicating with a second electronic device. This method may be performed by an electronic device, such as electronic device 110-1 in FIG. 1. Note that the communication with a second electronic device and a third electronic device may be compatible with a peer-to-peer communication protocol.

During operation, the electronic device may communicate first messages (operation 210) with the second electronic device in time slots and first channels in a first band of frequencies using a peer-to-peer communication protocol, where, in a given time slot, a given first channel in the first band of frequencies is used in the communication of the first messages.

Note that the peer-to-peer communication protocol may be compatible with an IEEE 802.11 communication protocol. Moreover, the peer-to-peer communication protocol may include NaN.

Then, the electronic device may communicate second messages (operation 212) with the second electronic device in the time slots and second channels in a second band of frequencies using the peer-to-peer communication protocol, where, in the given time slot, a given second channel in the second band of frequencies is used in the communication of the second messages. Note that the second channels are different from the first channels.

For example, the first band of frequencies may include a 2.4 GHz band of frequencies and the second band of frequencies may include: a 5 GHz band of frequencies or a 6 GHz band of frequencies.

Moreover, the communicating of the first messages and the communicating of the second messages may be based at least in part on a schedule that includes a first map indicating the time slots and the first channels, and a second map indicating the time slots and the second channels. Furthermore, the communicating of the first messages and the communicating of the second messages may at least partially overlap in time. Additionally, for the given time slot, the given second channel in the second band of frequencies may be preferred for communication associated with an application having a latency requirement that satisfies a predefined value. Note that the first messages and the second messages may include packets or frames.

In some embodiments, the electronic device optionally performs one or more additional operations (operation 214). For example, the electronic device may communicate with an access point in second time slots and third channels in the second band of frequencies.

Moreover, the electronic device may perform an off-channel activity in at least one of the time slots using at least some of the first channels, and/or at least some of the second channels. Note that the off-channel activity may use a different communication protocol than the peer-to-peer communication protocol.

Furthermore, the electronic device may perform a wireless scan in one of the first channels in a first time slot in the time slots and one of the second channels in a second time slot in the time slots, where the first time slot and the second time slot are sequential time slots. Note that the wireless scan may be compatible with an IEEE 802.11 communication protocol. Additionally, the electronic device may provide, while the interface circuit performs the wireless scan, an update message addressed to the second electronic device with information specifying availability of the electronic device in the time slots and the first channels and the second channels.

In some embodiments, the electronic device may receive, while the electronic device performs a wireless scan in alternating sequential time slots in the time slots and alternating channels in the first channels and the second channels, an update message associated with the second electronic device. This update message may include information specifying availability of the second electronic device in the time slots and the first channels and the second channels. Moreover, the electronic device may selectively transmit additional messages addressed to the second electronic device in the time slots corresponding to the first channels or the second channels based at least in part on the update message.

Furthermore, the electronic device may perform association with an access point in the second channels in the time slots while communicating the first messages in the time slots in the first channels. Note that the association may be compatible with an IEEE 802.11 communication protocol. Additionally, after the association is complete, the electronic device may: provide an update message addressed to the second electronic device that includes information specifying a subset of the time slots and a third channel used during communication with the access point; and resume the communicating of the second messages in a remainder of the time slots and the second channels using the peer-to-peer communication protocol.

In some embodiments of method 200, as well as in some or all of the figures below, there may be additional or fewer operations. Further, one or more different operations may be included. Moreover, the order of the operations may be changed, and/or two or more operations may be combined into a single operation or performed at least partially in parallel.

Figure 3:
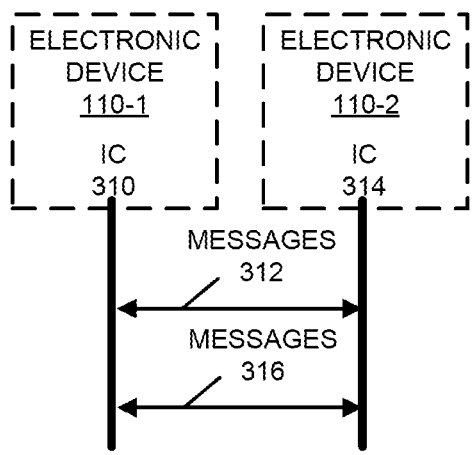
FIG. 3 illustrates an example of communication among components, e.g., in the electronic devices of FIG. 1, according to some embodiments of the disclosure.

The communication techniques are further illustrated in FIG. 3, which presents a flow diagram illustrating an example of communication among components in electronic device 110-1 and electronic device 110-2. During operation, an interface circuit (IC) 310 in electronic device 110-1 may communicate messages 312 with an interface circuit 314 in electronic device 110-2 in time slots and first channels in a first band of frequencies using a peer-to-peer communication protocol, where, in a given time slot, a given first channel in the first band of frequencies is used in the communication of the first messages. Moreover, interface circuit 310 may communicate messages 316 with interface circuit 314 in the time slots and second channels in a second band of frequencies using the peer-to-peer communication protocol, where, in the given time slot, a given second channel in the second band of frequencies is used in the communication of the second messages.

While communication between the components in FIG. 3 are illustrated with unilateral or bilateral communication (e.g., lines having a single arrow or dual arrows), in general a given communication operation may be unilateral or bilateral.

We now further discuss the communication techniques. As discussed previously, many electronic devices communicate messages (such as packets or frames) using peer-to-peer communication techniques, such as NaN. NaN offers the advantage of not having to pass the communication through a router or an access point.

During NaN, a first electronic device and a second electronic device may synchronize their clocks. Once synchronized, the first electronic device and the second electronic device may communicate using a scheduled combination of temporal multiplexing and frequency multiplexing. Notably, a band of frequencies may be divided into channels, which are used during time slots. Moreover, each of the electronic devices may publish or advertise their NaN schedule, including the channels and time slots that they will use.

Using NaN, a given electronic device may discover one or more available services, where, for a given service, the given electronic device may have a subscriber or a publishing role. After discovering a service, a subscriber may initiate a data negotiation with a publisher using service frames. For example, during the data negotiation, the subscriber and the publisher may agree to: a number of time slots, a channel in each time slot, and encryption keys to use. In this way, the communication between the publisher and the subscriber may aligned in time and frequency. Then, data may be transferred between the publisher and the subscriber.

Figure 4:
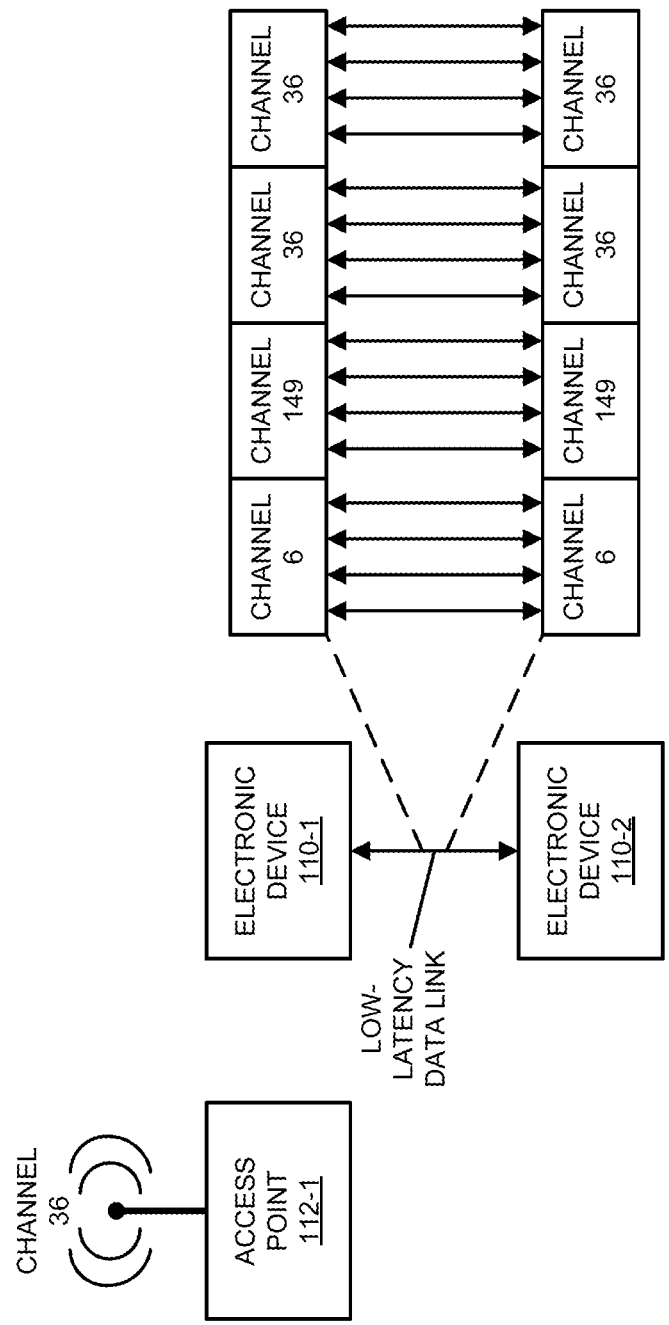
FIGS. 4-11 illustrate examples of communication between electronic devices, e.g., of FIG. 1, according to some embodiments of the disclosure.

As shown in FIG. 4, which presents an example of communication between electronic devices 110, real-time applications or services may be sensitive to latency. Consequently, the peers (such as electronic device 110-1 and electronic device 110-2) may want to use all the available NaN time slots. Thus, both peers should have 100% matching availability. For example, in sequence of consecutive time slots, electronic device 110-1 and electronic device 110-2 may communicate messages using: channel 6, channel 149, channel 36, channel 36, etc. However, channel 36 may also be used during infra-structure communication with an access point (such as access point 112-1) using Wi-Fi.

Figure 5:
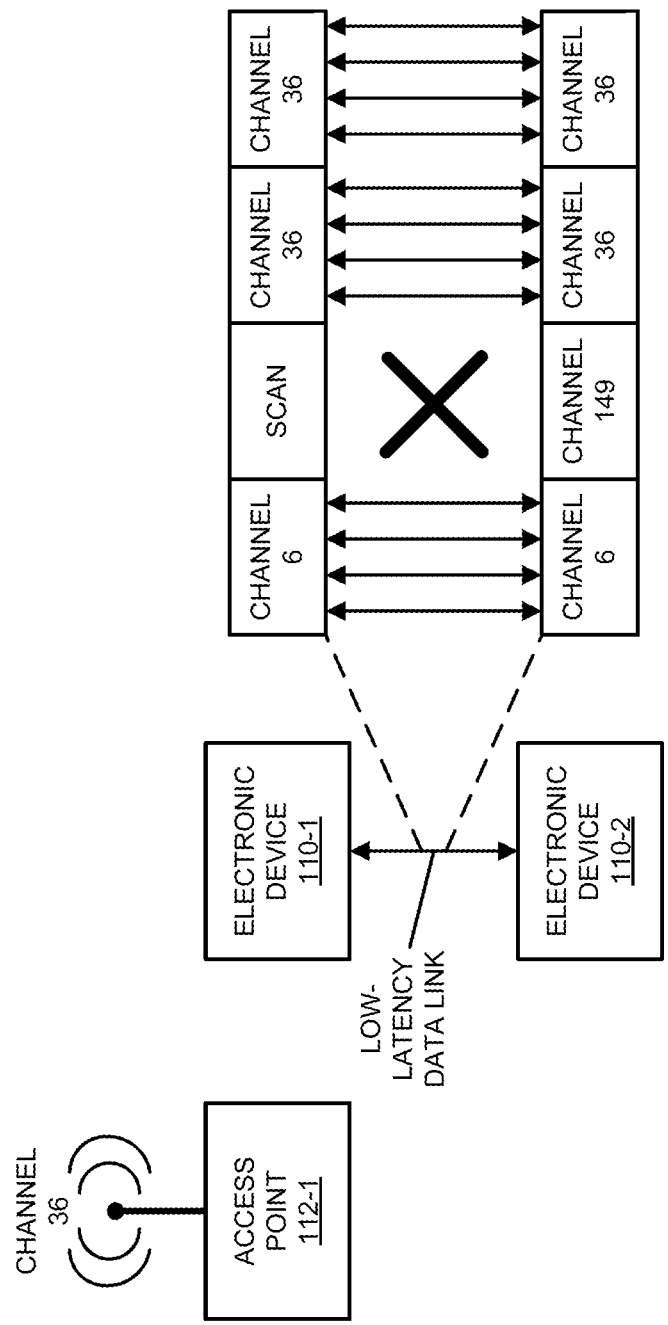

Moreover, as shown in FIG. 5, which presents an example of communication between electronic devices 110, because of the coexisting of NaN and infra-structure (Wi-Fi) communication, a given electronic device (such as electronic device 110-1) may need to periodically perform a wireless scan. During such a scan, the given electronic device may need to go off channel. This may involve pausing NaN traffic, such as during a time slot, a using a channel (such as channel 149) to perform the scan. However, pausing NaN traffic for a latency-sensitive application (such as an audio and/or a video application) may increase latency and, thus, may degrade the user experience.

Figure 6:
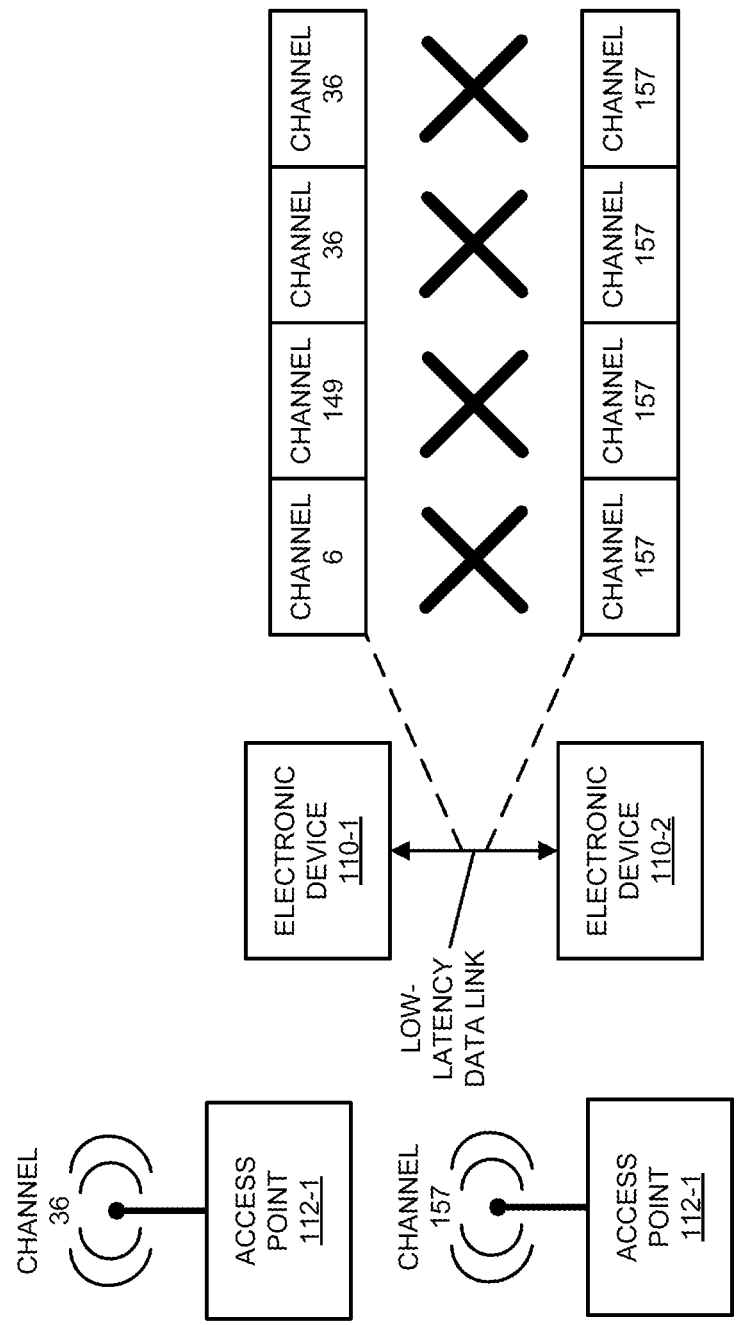

Similarly, as shown in FIG. 6, which presents an example of communication between electronic devices 110, during association with an access point (such as access point 112-1) or roaming from one access point to another access point, a given electronic device (such as electronic device 110-2) may need to be 100% on a channel, such as channel 157. Because electronic device 110-1 may not know about the association or the roaming, the NaN traffic has to be paused when electronic device 110-2 is associating or roaming.

Figure 7:
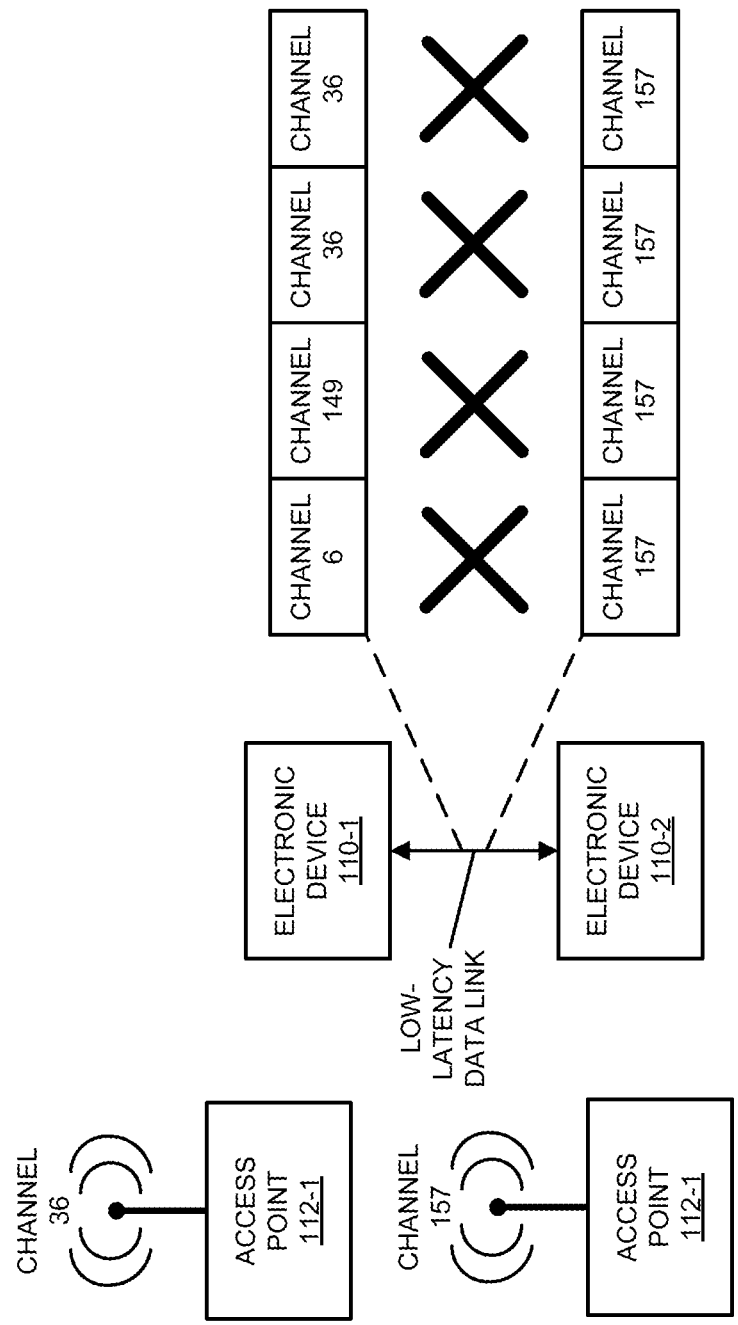

In principle, as shown in FIG. 7, which presents an example of communication between electronic devices 110, a solution to the aforementioned problems is to disallow scans and association when a low-latency application is running. However, disallowing scans or association may cause a given electronic device to be unable to roam and, thus, to eventually lose a link. Thus, a question is whether scans or association can be allowed without compromising the user experience.

Figure 8:
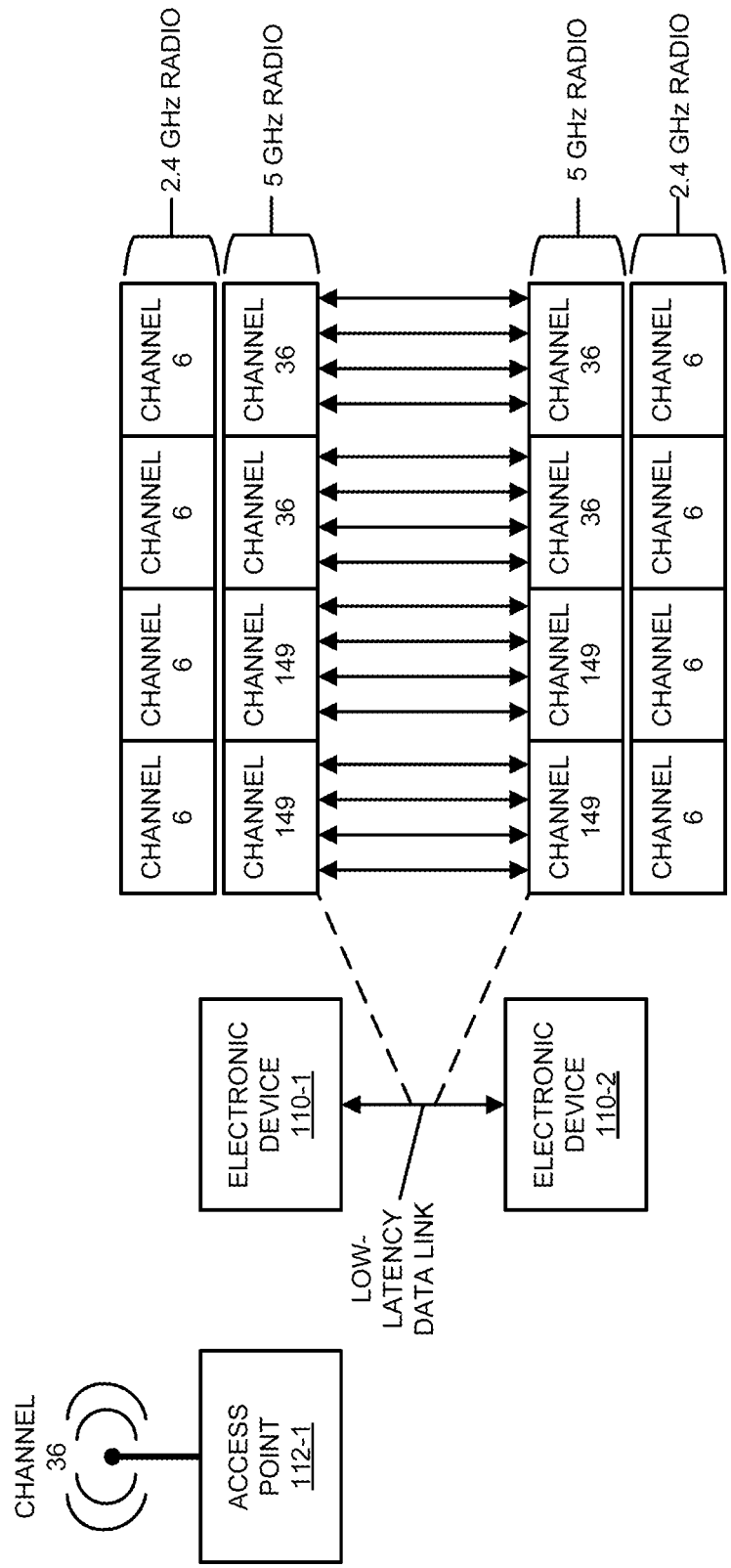

The disclosed communication techniques may address these problems, thereby facilitating coexistence of NaN communication and infra-structure communication. This is shown in FIG. 8, which presents an example of communication between electronic devices 110. Notably, the NaN communication may simultaneously use two or more bands of frequencies, such as 2.4 GHz and 5 GHz. This dual-band operation may be facilitated by a given electronic device advertising a NaN schedule for two radios with dual maps of the channels and time slots that are used in two different bands of frequencies (e.g., a first map for 2.4 GHz and a second map for 5 GHz). Consequently, at a given time, a given electronic device may be available on multiple different channels.

For a low-latency data link, both of the bands of frequencies may carry a 100% matched availability. Note that, when both bands of frequencies are available in the same time slot, the 5 GHz band of frequencies may be preferred for low-latency data transmission.

For example, electronic device 110-1 and electronic device 110-2 may communicate using NaN during time slots using channel 6 in the 2.4 GHz band of frequencies, and may communication using NaN during some time slots using channel 149 in the 5 GHz band of frequencies. In addition, electronic device 110-1 and electronic device 110-2 may communicate using Wi-Fi (i.e., infra-structure communication) during remaining time slots using channel 36 in the 5 GHz band of frequencies. Thus, there may be concurrent communication during some of the time slots using NaN and Wi-Fi in different bands of frequencies, while in the remaining time slots there may be concurrent communication using NaN in different bands of frequencies. Alternatively, in some embodiments, the dual-band communication may be reserved or available, but may not be used unless it is needed. In these embodiments, channel 6 in the time slots may be available in the 2.4 GHz band of frequencies, but may only be used for NaN communication if needed.

Figure 9:
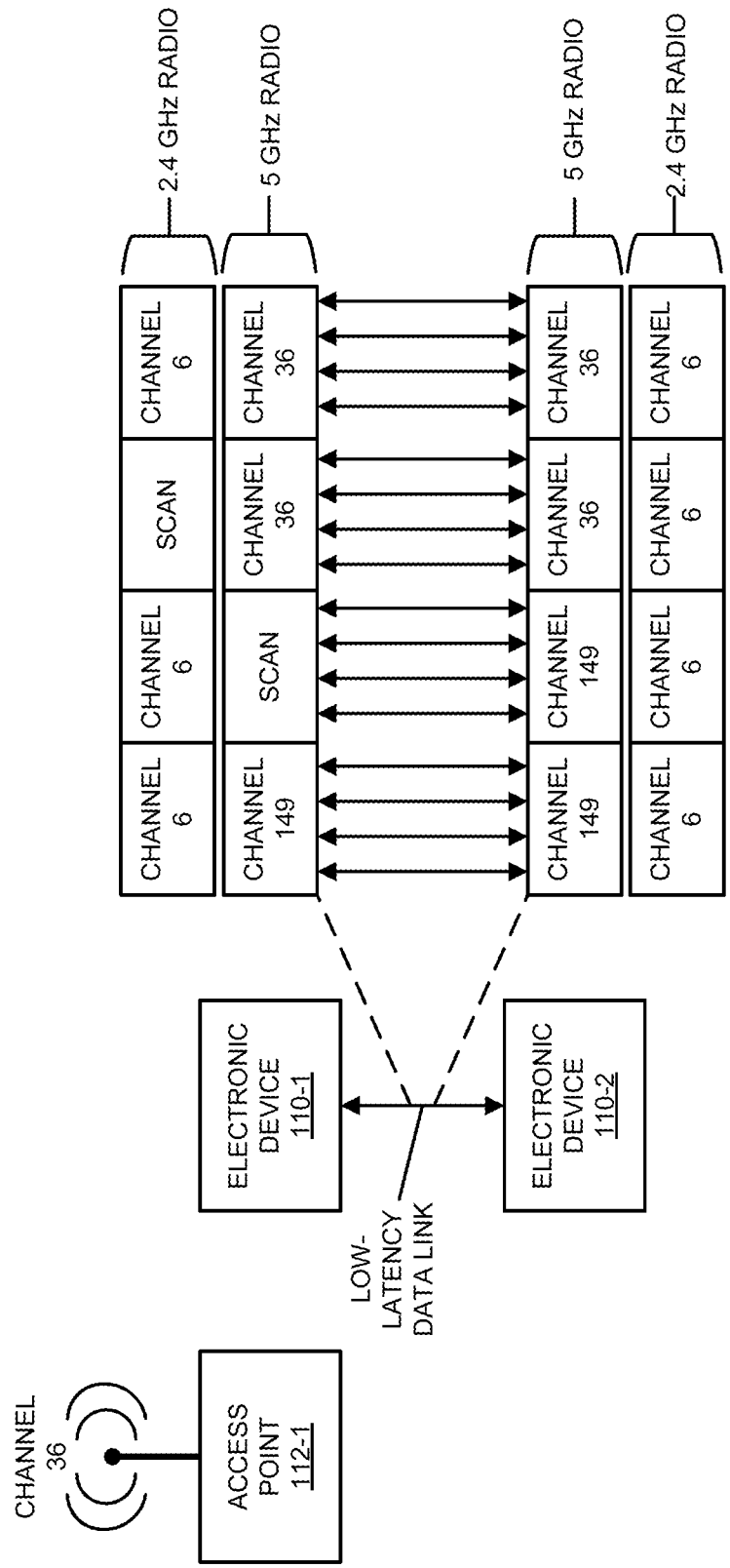

Furthermore, as shown in FIG. 9, which presents an example of communication between electronic devices 110, scans may be allotted to alternating time slots in different bands of frequencies. When a radio is scanning on the first band of frequencies, the other radio may be available for data transfer in the second band of frequencies. Note that the availability attribute may carry or convey the scan time slots in a NaN schedule update action frame, which may be used to convey changes to a NaN schedule. The NaN schedule update action frame may be transmitted in a beacon in a social slot, which may also include the dual maps or availability information. In this way, the peer (or peer device) may learn the updated availability. Moreover, the peer may be available to receive on both bands of frequencies, while for transmitting the peer may pick the matching time slots from either of the bands of frequencies. For example, electronic device 110-1 may perform a scan in the second time slot in the 5 GHz band of frequencies, and then may perform a scan in the third time slot in the 2.4 GHz band of frequencies.

Figure 10:
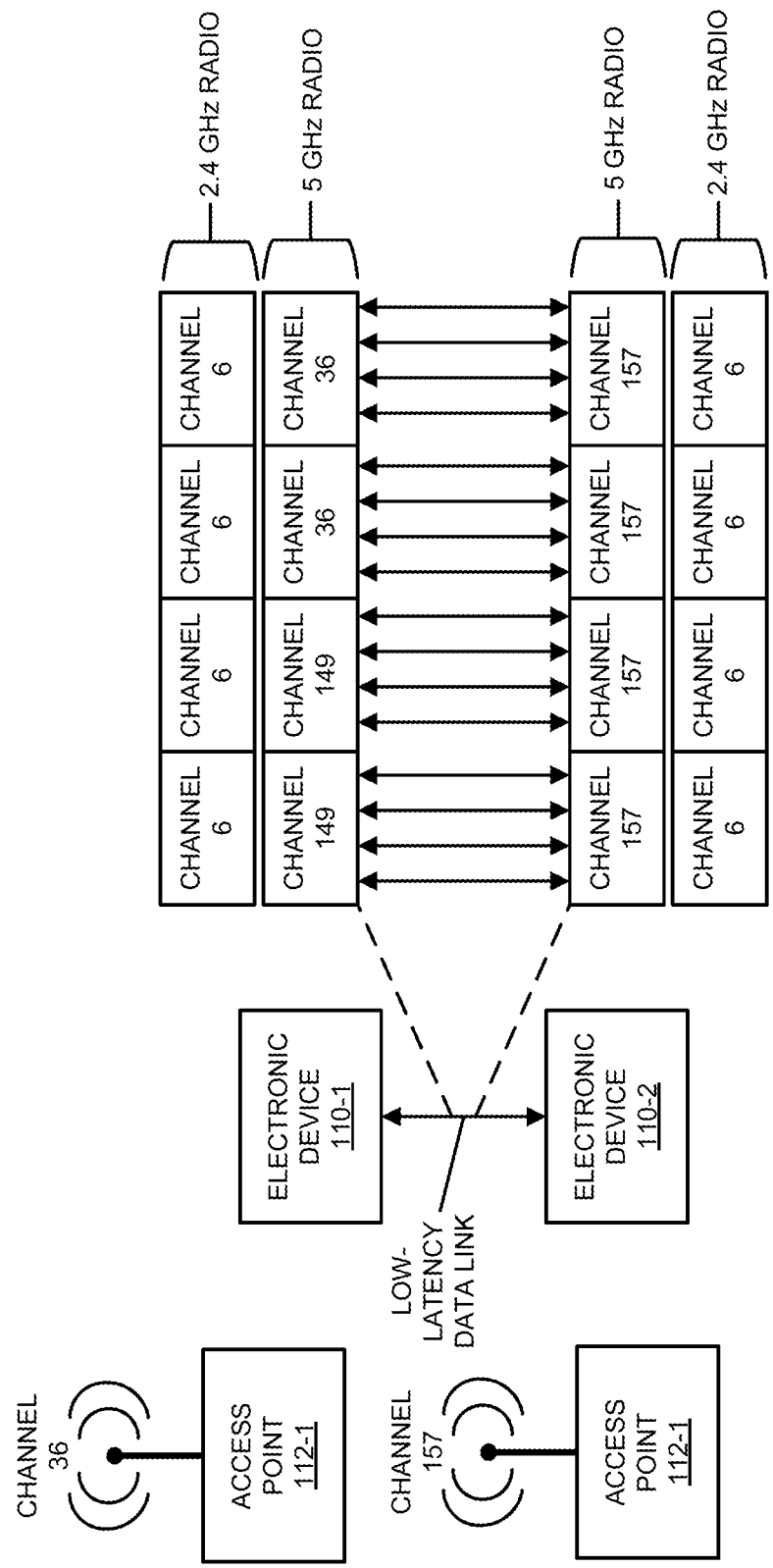
Figure 11:
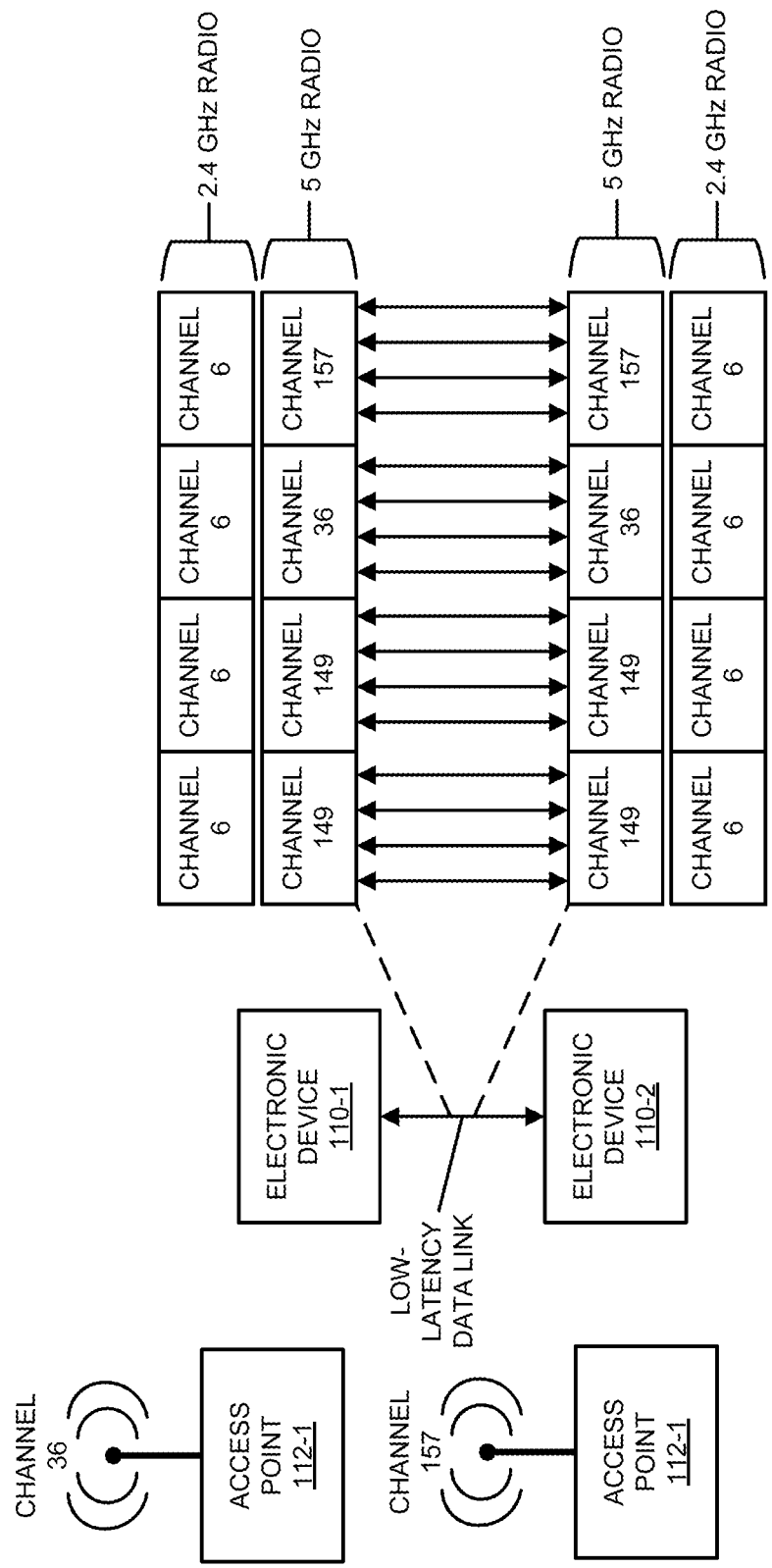

Additionally, as shown in FIGS. 10 and 11, which present examples of communication between electronic devices 110, a given electronic device may allot all the time slots to the association channel on a given band of frequencies. The other band of frequencies may be used for transmission and reception. Once association is completed, the peer may learn the new association channel and traffic may resume, e.g., on the 5 GHz band of frequencies.

For example, as shown in FIG. 10, initially electronic device 110-1 may have channel 6 in the 2.4 GHz band of frequencies and channel 149 in the 5 GHz band of frequencies available for communication in time slots using NaN, and may use channel 36 in the 5 GHz band of frequencies for communication in some time slots using Wi-Fi. Moreover, electronic device 110-2 may have channel 6 in the 2.4 GHz band of frequencies available for communication in time slots using NaN, and may use channel 157 in the 5 GHz band of frequencies for communication in time slots using Wi-Fi.

Subsequently, as shown in FIG. 11, electronic device 110-1 may associate with a second access point (such as access point 112-2) in channel 157 in the 5 GHz band of frequencies, and the electronic device 110-2 associate with an access point (such as access point 112-1) in channel 36 in the 5 GHz band of frequencies. Therefore, electronic device 110-1 may have channel 6 in the 2.4 GHz band of frequencies and channel 149 in the 5 GHz band of frequencies available for communication in time slots using NaN, and may use channel 36 and channel 157 in the 5 GHz band of frequencies for communication in some time slots using Wi-Fi. Moreover, electronic device 110-2 may have channel 6 in the 2.4 GHz band of frequencies available for communication in time slots using NaN, and may use channel 36 and channel 157 in the 5 GHz band of frequencies for communication in time slots using Wi-Fi.

Moreover, the communication techniques may be extended to other bands of frequencies. For example, the communication techniques may be used with integrated circuits that support multiple simultaneous radios and on different bands of frequencies including the 6 GHz band of frequencies. Furthermore, the communication techniques may be used with another off-channel activity other than a scan or association.

In some embodiments, peer-to-peer communication protocols (such as NaN), where peers are time synchronized, may divide the air time into time slots. Each available time slot may carry a valid channel number. For latency-sensitive real-time application between peers, the availability on all the time slots may match with valid channels.

When coexisting with infra-structure connection, electronic devices may perform periodic scans to discover neighboring Wi-Fi routers or access points. The scanning usually requires an electronic device to go off channel for a short duration. Typically, a few time slots are reserved for a scan for a certain time duration. When the electronic device is scanning, peer-to-peer communication may not happen as the time-slot channels may not match, so the data transfer may have to pause. These data pause may increase the latency and, thus, may degrade the user experience. Consequently, in order to maintain the quality of service (QoS) and to achieve the low-latency budgets, scans are often disallowed.

Similarly, if an electronic device roams to a different access point on a different channel, the electronic device may have to switch to the new channel in order to complete the association until an Internet Protocol (IP) address is assigned. Association may require 100% availability on the channel, because the extensible authentication protocol (EAP) over LAN (EAPoL) exchange may fail if the electronic device goes in and out of the channel. Therefore, during the association process, low-latency data transfer may be paused.

The disclosed communication techniques may address the problem of QoS degradation because of data-flow pausing during scanning and/or association. Notably, simultaneous dual band (SDB) electronic devices may operate simultaneously in the 2.4 GHz and the 5 GHz bands of frequencies. NAN may support availability with multiple maps, so that, at the same time, an electronic device may be available on multiple different channels. For SDB electronic devices, NAN availability may carry two or more maps, such as one for the 2.4 GHz band of frequencies and the other for the 5 GHz band of frequencies. For a low-latency data link, both bands of frequencies may carry a 100% matched availability. When both bands are available in the same time slot, the 5 GHz band of frequencies may be the preferred band for low-latency data transmission.

During scanning, scans may be allotted to alternating time slots in different bands of frequencies. When a radio is scanning on a band of frequencies, the other band radio may be available for data transfer. Moreover, the availability attribute may carry the scan the slots in the NAN schedule update action frame. A peer may learn the updated availability. Furthermore, the peer may be available on both bands to receive, and for transmitting the peer may pick the matching time slots from either of the bands of frequencies.

During association, an electronic device may allot all time slots to the association channel on a given band of frequencies. The other band of frequencies may be used for transmission and reception. After the association is completed, the peer may learn the new association channel and traffic may resume, e.g., on the 5 GHz band of frequencies.

The communication techniques may be extended for an integrated circuit that supports multiple simultaneous radios and on different bands of frequencies, including the 6 GHz band of frequencies. Furthermore, the communication techniques may be used for an arbitrary off-channel activity other than a scan or association.

In summary, the disclosed communication techniques may facilitate coexisting peer-to-peer communication and infrastructure communication with improved communication performance, such as reduced latency and improved availability.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots.

Moreover, while the preceding embodiments illustrated the use of NaN and Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 7 GHz frequency band, a 60 GHz frequency band, a Citizens Broadband Radio Service (CBRS) frequency band, a band of frequencies used by LTE, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 12 presents a block diagram of an electronic device 1200 (which may be a cellular telephone, a smartwatch, an access point, a wireless speaker, an IoT device, another electronic device, etc.) in accordance with some embodiments. This electronic device includes processing subsystem 1210, memory subsystem 1212 and networking subsystem 1214. Processing subsystem 1210 includes one or more devices configured to perform computational operations. For example, processing subsystem 1210 can include one or more microprocessors, application-specific integrated circuits (ASICs), microcontrollers, graphics processing units (GPUs), programmable-logic devices, and/or one or more digital signal processors (DSPs).

Memory subsystem 1212 includes one or more devices for storing data and/or instructions for processing subsystem 1210, and/or networking subsystem 1214. For example, memory subsystem 1212 can include dynamic random access memory (DRAM), static random access memory (SRAM), a read-only memory (ROM), flash memory, and/or other types of memory. In some embodiments, instructions for processing subsystem 1210 in memory subsystem 1212 include: program instructions or sets of instructions (such as program instructions 1222 or operating system 1224), which may be executed by processing subsystem 1210. For example, a ROM can store programs, utilities or processes to be executed in a non-volatile manner, and DRAM can provide volatile data storage, and may store instructions related to the operation of electronic device 1200. Note that the one or more computer programs may constitute a computer-program mechanism, a computer-readable storage medium or software. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210. In some embodiments, the one or more computer programs are distributed over a network-coupled computer system so that the one or more computer programs are stored and executed in a distributed manner.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Networking subsystem 1214 includes one or more devices configured to couple to and communicate on a wired and/or wireless network (i.e., to perform network operations), such as: control logic 1216, one or more interface circuits 1218 and a set of antennas 1220 (or antenna elements) in an adaptive array that can be selectively turned on and/or off by control logic 1216 to create a variety of optional antenna patterns or 'beam patterns.' Alternatively, instead of the set of antennas, in some embodiments electronic device 1200 includes one or more nodes 1208, e.g., a pad or a connector, which can be coupled to the set of antennas 1220. Thus, electronic device 1200 may or may not include the set of antennas 1220. For example, networking subsystem 1214 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), a NaN networking system, another peer-to-peer network system, an Ethernet networking system, and/or another networking system.

In some embodiments, networking subsystem 1214 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting advertising or frame frames and/or scanning for advertising frames transmitted by other electronic devices.

Within electronic device 1200, processing subsystem 1210, memory subsystem 1212 and networking subsystem 1214 are coupled together using bus 1228 that facilitates data transfer between these components. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/or electro-optical connections among the subsystems.

In some embodiments, electronic device 1200 includes a display subsystem 1226 for displaying information on a display, which may include a display driver and the display, such as a liquid-crystal display, a multi-touch touchscreen, etc. Display subsystem 1226 may be controlled by processing subsystem 1210 to display information to a user (e.g., information relating to incoming, outgoing, or an active communication session).

Electronic device 1200 can also include a user-input subsystem 1230 that allows a user of the electronic device 1200 to interact with electronic device 1200. For example, user-input subsystem 1230 can take a variety of forms, such as: a button, keypad, dial, touch screen, audio input interface, visual/image capture input interface, input in the form of sensor data, etc.

Electronic device 1200 can be (or can be included in) any electronic device with at least one network interface. For example, electronic device 1200 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or display sub systems. Additionally, one or more of the subsystems may not be present in electronic device 1200. Moreover, in some embodiments, electronic device 1200 may include one or more additional subsystems that are not shown in FIG. 12. In some embodiments, electronic device may include an analysis subsystem that performs at least some of the operations in the communication techniques. Also, although separate subsystems are shown in FIG. 12, in some embodiments some or all of a given subsystem or component can be integrated into one or more of the other subsystems or component(s) in electronic device 1200. For example, in some embodiments program instructions 1222 are included in operating system 1224 and/or control logic 1216 is included in the one or more interface circuits 1218.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1214. This integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1222, operating system 1224 (such as a driver for an interface circuit in networking subsystem 1214) or in firmware in an interface circuit networking subsystem 1214. Alternatively or additionally, at least some of the operations in the communication techniques may be implemented in a physical layer, such as hardware in an interface circuit in networking subsystem 1214. In some embodiments, the communication techniques are implemented, at least in part, in a MAC layer and/or in a physical layer in an interface circuit in networking subsystem 1214.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna node communicatively coupled to an antenna; and
   an interface circuit, communicatively coupled to the antenna node, configured to communicate with a second electronic device using a peer-to-peer communication protocol, wherein the interface circuit is configured to:
   communicate, with the second electronic device, first messages in time slots corresponding to first channels associated with a first band of frequencies, wherein, in a given time slot of the time slots, a given first channel in the first band of frequencies is used in the communication of the first messages; and
   communicate, with the second electronic device, second messages in the time slots corresponding to second channels associated with a second band of frequencies, wherein, in the given time slot of the time slots, a given second channel in the second band of frequencies is used in the communication of the second messages,
   wherein the second channels are different from the first channels, and
   wherein, for the given time slot, the given second channel in the second band of frequencies is preferred for communication associated with an application having a latency requirement that satisfies a predefined value.

2. The electronic device of claim 1, wherein the peer-to-peer communication protocol is compatible with an Institute of Electrical and Electronics Engineers (IEEE) 802.11 communication protocol.

3. The electronic device of claim 1, wherein the peer-to-peer communication protocol comprises a neighbor awareness networking (NaN) protocol.

4. The electronic device of claim 1, wherein the first band of frequencies comprises a 2.4 GHz band of frequencies and the second band of frequencies comprises one of: a 5 GHz band of frequencies or a 6 GHz band of frequencies.

5. The electronic device of claim 1, wherein the communicating of the first messages and the communicating of the second messages is based at least in part on a schedule that comprises a first map indicating the time slots corresponding to the first channels, and a second map indicating the time slots corresponding to the second channels.

6. The electronic device of claim 1, wherein the communicating of the first messages and the communicating of the second messages at least partially overlap in time.

7. The electronic device of claim 1, wherein the interface circuit is further configured to communicate with an access point in second time slots corresponding to third channels in the second band of frequencies.

8. The electronic device of claim 1, wherein the interface circuit is configured to perform an off-channel activity in at least one of the time slots, using at least some of the first channels, at least some of the second channels, or both; and
wherein the off-channel activity uses a different communication protocol than the peer-to-peer communication protocol.

9. The electronic device of claim 1, wherein the interface circuit is configured to perform a wireless scan in one of the first channels in a first time slot of the time slots and one of the second channels in a second time slot of the time slots; and
wherein the first time slot and the second time slot are sequential time slots.

10. The electronic device of claim 9, wherein the interface circuit is configured to provide, while the interface circuit performs the wireless scan, an update message addressed to the second electronic device, indicating availability of the electronic device in the time slots for both the first channels and the second channels.

11. The electronic device of claim 1, wherein the interface circuit is configured to receive, while the interface circuit performs a wireless scan in alternating sequential time slots of the time slots using alternating channels in the first channels and the second channels, an update message associated with the second electronic device, indicating availability of the second electronic device in the time slots for both the first channels and the second channels.

12. The electronic device of claim 11, wherein the interface circuit is configured to selectively transmit additional messages addressed to the second electronic device in the time slots corresponding to the first channels or the second channels based at least in part on the update message.

13. The electronic device of claim 1, wherein the interface circuit is configured, during the time slots, to associate with an access point using the second channels and communicate the first messages using the first channels.

14. The electronic device of claim 13, wherein, after the association is complete, the interface circuit is configured to:
provide an update message addressed to the second electronic device comprising information indicating a first subset of the time slots and a third channel for communication with the access point; and
resume the communicating of the second messages in a second subset of the time slots and the second channels using the peer-to-peer communication protocol.

15. The electronic device of claim 1, wherein the first messages and the second messages comprise packets or frames.

16. A non-transitory computer-readable storage medium for use with an electronic device, wherein the non-transitory computer-readable storage medium stores program instructions that, when executed by the electronic device, cause the electronic device to perform operations comprising:
communicating, with a second electronic device, first messages in time slots corresponding to first channels in a first band of frequencies using a peer-to-peer communication protocol, wherein, in a given time slot of the time slots, a given first channel in the first band of frequencies is used in the communication of the first messages; and
communicating, with the second electronic device, second messages in the time slots corresponding to second channels in a second band of frequencies using the peer-to-peer communication protocol, wherein, in the given time slot of the time slots, a given second channel in the second band of frequencies is used in the communication of the second messages,
wherein the second channels are different from the first channels, and
wherein, for the given time slot, the given second channel in the second band of frequencies is preferred for communication associated with an application having a latency requirement that satisfies a predefined value.

17. The non-transitory computer-readable storage medium of claim 16, wherein the operations comprise performing an off-channel activity in at least one of the time slots using at least some of the first channels, at least some of the second channels, or both; and
wherein the off-channel activity uses a different communication protocol than the peer-to-peer communication protocol.

18. A method for communicating with a second electronic device, comprising:
by an electronic device:
communicating, with the second electronic device, first messages in time slots corresponding to first channels in a first band of frequencies using a peer-to-peer communication protocol, wherein, in a given time slot of the time slots, a given first channel in the first band of frequencies is used in the communication of the first messages; and
communicating, with the second electronic device, second messages in the time slots corresponding to second channels in a second band of frequencies using the peer-to-peer communication protocol, wherein, in the given time slot of the time slots, a given second channel in the second band of frequencies is used in the communication of the second messages,
wherein the second channels are different from the first channels, and
wherein, for the given time slot, the given second channel in the second band of frequencies is preferred for communication associated with an application having a latency requirement that satisfies a predefined value.

19. The method of claim 18, wherein the method comprises performing an off-channel activity in at least one of the time slots using at least some of the first channels, at least some of the second channels, or both; and
wherein the off-channel activity uses a different communication protocol than the peer-to-peer communication protocol.

20. The method of claim 18, wherein the method comprises receiving, while performing a wireless scan in alternating sequential time slots of the time slots using alternating channels in the first channels and the second channels, an update message indicating availability of the second electronic device in the time slots for both the first channels and the second channels.

* * * * *